(12) United States Patent
Gabler et al.

(10) Patent No.: US 6,211,881 B1
(45) Date of Patent: Apr. 3, 2001

(54) IMAGE FORMAT CONVERSION WITH TRANSPARENCY COLOR ADJUSTMENT

(75) Inventors: Jeffrey R. Gabler; Darrell J. Starnes, both of Tomball, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/133,514

(22) Filed: Aug. 12, 1998

Related U.S. Application Data (60) Provisional application No. 60/085,309, filed on May 13, 1998.

(51) Int. Cl.[7] .................................................. G06T 15/00
(52) U.S. Cl. ............................................ 345/418; 345/433
(58) Field of Search ........................... 345/418, 431, 345/433, 438, 439

(56) References Cited

U.S. PATENT DOCUMENTS

| | | |
|---|---|---|
| 5,764,235 | 6/1998 | Hunt et al. . |
| 5,848,415 * | 12/1998 | Guck ....................................... 707/10 |
| 6,057,842 * | 5/2000 | Knownlton et al. ................. 345/348 |
| 6,061,696 * | 5/2000 | Lee et al. .............................. 707/513 |
| 6,067,571 * | 5/2000 | Igarashi et al. ........................ 348/15 |
| 6,073,168 * | 6/2000 | Mighdoll et al. ....................... 707/10 |

OTHER PUBLICATIONS

R. Fielding et al., "Hypertext Transfer Protocol–HTTP/1.1", HTTP Working Group, Aug. 12, 1996, pp. 1–110.
"WinGate 2.1 is Officially Released", www.wingate.net, 1997.
"WinGate Opens the Internet Door", LAN Times (www-.lanstimes.com/97/97jan/701b066a.html), Jan. 1997.
"Microsoft Proxy Server 1.0", Microsoft Corporation (www.microsoft.com/products/prodrfe/130_ov.htm).
"Microsoft Announces Proxy Server 2.0", Microsoft Corporation (www.microsoft.com/corpinfo/press/1997/oct97/proxy2pr.htm), Oct. 8, 1997.
"Microsoft Proxy Server 2.0; What's New ", Microsoft Corporation (www.microsoft.com/proxy/guide/whatsnew:asp?a=2&B=1).
Microsoft Proxy Server 2.0; Technical Papers, Cache Array Routing Protocol (CARP) Whitepaper, Microsoft Corporation (www.microsoft.com/proxy/guide/CarpWP.asp?A=2&B=3).
"GIF Grammar", pp. 1–2.
"All About GIF89a", www.ecafe.org/tools/gifanim/gifabout.htm, (downloaded May 7, 1998).
Graphics Interchange Format (GIF) Standard, (www.ecafe.org/tools/gifanim/gif87a.txt) Jun. 15, 1997.
Graphics Interchange Format (GIF), Version 89a, CompuServe Incorporated, Jul. 31, 1990.

* cited by examiner

Primary Examiner—Cliff N. Vo
(74) Attorney, Agent, or Firm—Akin, Gump, Strauss, Hauer & Feld, LLP (57) ABSTRACT

Improved image format conversion techniques that provide improved conversion from an image format supporting transparency to an image format not supporting transparency. The techniques replace a transparency color in an original image format prior to format conversion. Consequently, the format conversion uses the replacement transparency color instead of the original transparency color, and thus is able to provide improved image conversion when converting from an image format supporting transparency to an image format not supporting transparency.

19 Claims, 6 Drawing Sheets

IMAGE FORMAT CONVERSION WITH TRANSPARENCY COLOR ADJUSTMENT

CROSS-REFERENCE TO RELATED APPLICATIONS

This application claims the benefit of U.S. Provisional Application No. 60/085,309, entitled "METHOD AND APPARATUS FOR STORAGE AND DELIVERY OF CONTENT", and filed on May 13, 1998, the disclosure of which is incorporated herein by reference for all purposes.

This application is related to U.S. Pat. application No. 09/133,498, filed Aug. 12, 1999 entitled "METHOD AND APPARATUS FOR PROVIDING ACCELERATED CONTENT DELIVERY OVER A NETWORK," and assigned to the assignee of the present application, which is hereby incorporated herein by reference for all purposes.

This application is related to U.S. Pat. application No. 09/133,791, filed Aug. 12, 1999, entitled "ACCELERATED CONTENT DELIVERY OVER A NETWORK USING REDUCED SIZE OBJECTS," and assigned to the assignee of the present application, which is hereby incorporated herein by reference for all purposes.

This application is also related to U.S. Pat. application No. 09/133,482 filed Aug. 12, 1998, entitled "METHOD AND APPARATUS FOR PROVIDING A GUARANTEED MINIMUM LEVEL OF PERFORMANCE FOR CONTENT DELIVERY OVER A NETWORK," and assigned to the assignee of the present application, which is hereby incorporated herein by reference for all purposes.

This application is also related to U.S. Pat. application No. 09/133,514, filed Aug. 12, 2000, entitled "METHOD AND APPARATUS FOR EFFICIENT STORAGE AND RETRIEVAL OF OBJECTS IN AND FROM AN OBJECT STORAGE DEVICE," and assigned to the assignee of the present application, which is hereby incorporated herein by reference for all purposes.

This application is also related to U.S. Pat. application No. 09/132,952, filed Aug. 12, 1998, entitled "METHOD AND SYSTEM CONDENSING ANIMATED IMAGES," and assigned to the assignee of the present application, which is hereby incorporated herein by reference for all purposes.

BACKGROUND OF THE INVENTION

1. Field of the Invention

The present invention relates to graphical images and, more particularly, to format conversion of graphical images.

2. Description of the Related Art

Graphic images are often stored as image files in a variety of different formats. Often these formats contain some sort of compression to keep the size of the image files manageable. For example, GIF, TIFF and JPEG are popular formats for image files.

However, with conversion between image formats sometimes features supported in one format are not supported in the other format. Such discrepancies lead to incomplete conversion of the images such that the resulting images when displayed are not identical and sometimes have distinct differences. For example, GIF89a supports transparency, but JPEG does not. Hence, conversion of GIF89a images presents a problem because JPEG does not support transparency data. For example, straightforward conversion of GIF89a images to JPEG images often results in an undesirable color appearing in the resulting JPEG image. This is due to the use of an unusual color in the GIF89a image as the transparency color. With GIF89a images, the transparency color is never seen because it is treated as "transparent" when displayed. JPEG images, however, have no transparency support, so the conversion to JPEG results in a color (usually an unusual color) undesirably appearing when the JPEG image is viewed.

Thus, there is a need for improved techniques for image format conversion between formats having different transparency support.

SUMMARY OF THE INVENTION

The invention relates to improved image format conversion techniques that provide improved conversion from an image format supporting transparency to an image format not supporting transparency. The invention replaces a transparency color in an original image format prior to format conversion. Consequently, the format conversion uses the replacement transparency color instead of the original transparency color, and thus is able to provide improved image conversion when converting from an image format supporting transparency to an image format not supporting transparency. The replacement transparency color can be any desirable color, but is preferably chosen to blend with the image. The replacement transparency color can also be matched to the background color.

The invention can be implemented in numerous ways, including as a method, an apparatus, a system, or computer readable medium. Several embodiments of the invention are summarized below.

As a method for converting a source image file having a first image format to a target image having a second image format, one embodiment of the invention includes the acts of: determining whether the source image having with the first image format uses at least one transparent portion; receiving a color table from the source image file; identifying a transparent color for the at least one transparent portion from the color table; determining a replacement transparent color for use with the target image having the second image format; modifying the color table by substituting the replacement transparent color for the transparent color; and thereafter converting the source image file having the first image format to the target image file having the second image format in accordance with the modified color table.

As a method for converting a source image file having a first image format to a target image having a second image format, one embodiment of the invention includes the acts of: allocating a memory block in the memory of the computer system; reading a header block from the source image file; reading a logical screen descriptor block from the source image file; determining whether a color table is present in the source image file; reading the color table into the memory block when the determining act determines that the color table is present in the source image file; reading a graphic control block for an image block in the source image file; determining whether transparency is used in the image block by an examination of the graphic control block; identifying a transparent color index for the color table; determining a replacement transparent color for use with the target image having the second image format, where the second image format does not support transparency; modifying the color table by substituting the replacement transparent color for the transparent color; and thereafter converting the source image file having the first image format to the target image file having the second image format in accordance with the modified color table.

As a computer readable medium containing computer program code for converting a source image file having a first image format to a target image having a second image format, an embodiment of the invention includes: computer program code for receiving the source image file having with the first image format that uses at least one transparent portion; computer program code for receiving a color table from the source image file; computer program code for identifying a transparent color for the at least one transparent portion from the color table; computer program code for determining a replacement transparent color for use with the target image having the second image format; computer program code for modifying the color table by substituting the replacement transparent color for the transparent color; and computer program code for converting the source image file having the first image format to the target image file having the second image format in accordance with the modified color table.

The advantages of the invention are numerous. One advantage of the invention is that display of the image resulting from the image format conversion appears more like the original image. Another advantage of the invention is that the transparency color for those portions of an image intended to be transparent is controllable.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to improved image format conversion techniques that provide improved conversion from an image format supporting transparency to an image format not supporting transparency.

Embodiments of the invention are discussed below with reference to FIGS. 1 –5. However, those skilled in the art will readily appreciate that the detailed description given herein with respect to these figures is for explanatory purposes as the invention extends beyond these limited embodiments.

Graphics images are commonly converted from one file or transmission format to another for a variety of reasons. The original format may not be compatible with or supported by the desired viewing or manipulation tool. A different image format may also produce a smaller file size. Further, a particular feature of particular format may be desired that is not supported by the original image format.

The invention replaces the transparency color in the original image format prior to format conversion. Consequently, the format conversion uses the replacement transparency color instead of the original transparency color, and thus is able to provide improved image conversion when converting from an image format supporting transparency to an image format not supporting transparency. The replacement transparency color can be any desirable color, but is preferably chosen to blend with the image. The replacement transparency color can also be matched to the background color.

Figure 1:
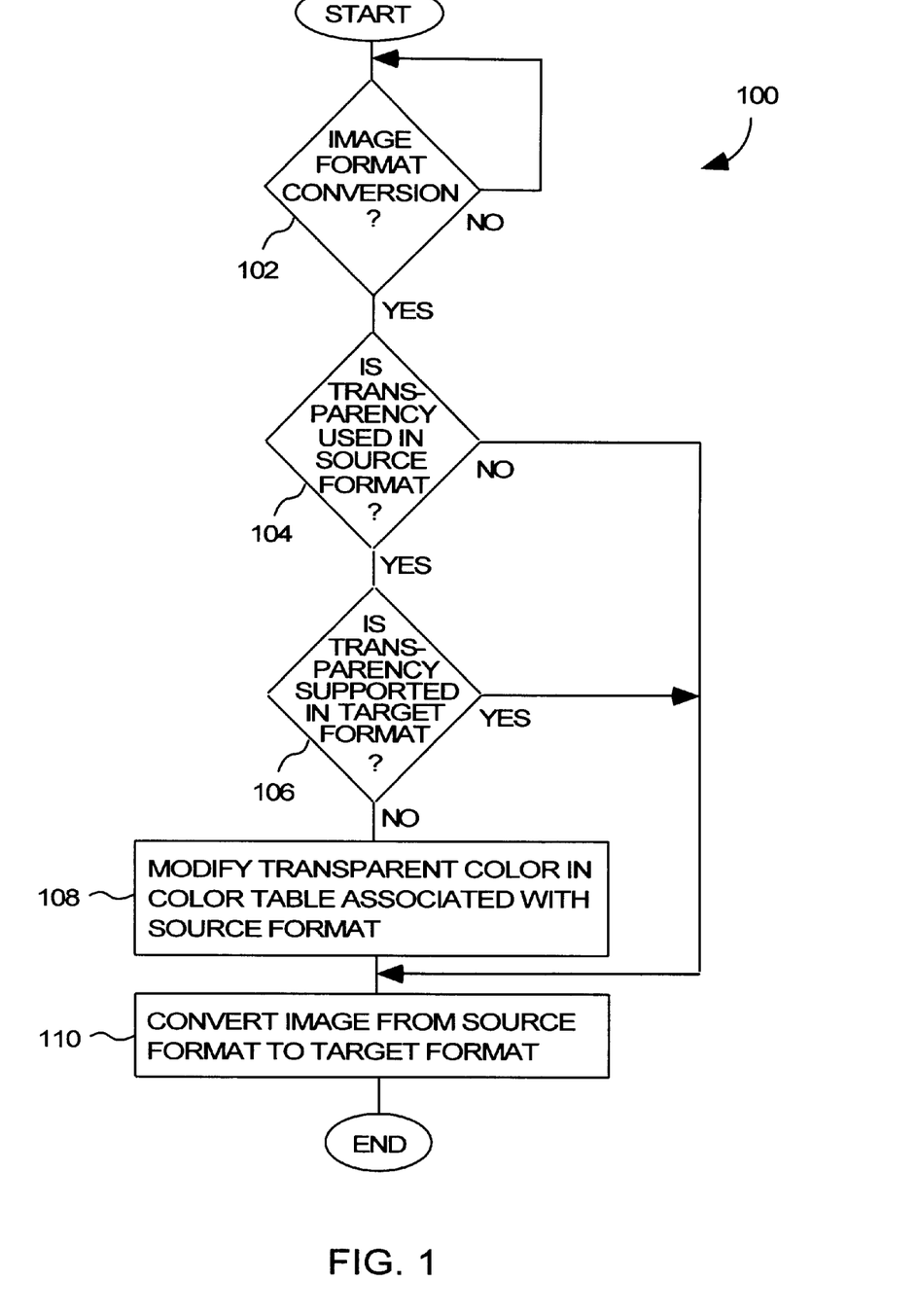
FIG. 1 is a flow diagram of image format conversion processing according to an embodiment of the invention.

FIG. 1 is a flow diagram of image format conversion processing 100 according to an embodiment of the invention. The image format conversion being performed is typically to allow a user to properly view the image or to convert from an original image format to another image format for any of a number of reasons. One reason to convert between image formats is to compress the size of the image file prior to storage or transmission of the image file. The image format conversion processing 100 is typically performed by a computer system.

The image format conversion processing 100 begins with a decision block 102 that determines whether image format conversion is desired. The decision block 102 thus signifies that the image format conversion processing 100 is performed to convert the image from a source format to a target format. The image originally has the source format and the image format conversion 100 operates to change the image to the target format. The source format is different from the target format. In any case, when the decision block 102 determines that image format conversion is desired, then a decision block 104 determines whether transparency is used in the source format. Certain image formats support the use of transparency which allows portions of an image to be transparent. The ability for images to have translucent portions allows for increased flexibility in producing graphical images with many shapes and many characteristics.

However, unfortunately, many image formats do not support transparency. Hence, special considerations are required when converting between image formats that do support transparency to those image formats that do not support transparency. Conventionally, as noted above, the discrepancy in the support for transparency between image formats was ignored. The invention provides special processing to compensate for the lack of support for transparency. Thus, the special processing according to the invention is used during image format conversion which converting from an image format that provides transparency to an image format that does not.

When the decision block 104 determines that transparency is used in the source format, then a decision block 106 determines whether transparency is supported in the target format. When the transparency is not supported by the target format, then a transparent color in a color table associated with the source format is modified 108. Here, the transparent color in the color table is changed to a more suitable color. Given that transparency is not supported in the target format, the transparent color represents the color displayed in the transparent portions of the image. Since the transparent color in the source format of the image is often not an appropriate color to actually be displayed, the invention operates to replace the original transparent color with the more suitable color. The more suitable color is a color that will be displayed for the image in the target format where the image was originally intended to be transparent. Examples of more suitable colors can vary with the application, but an off-white color is often a good default choice. Also, the more suitable color could be the color of the background behind the image, thus providing the same effect as transparency when displayed.

On the other hand, when transparency is not used in the source format, or when transparency is used in the source format but also supported in the target format, then the modification to the transparent color in the color table in block 108 is bypassed. In this case, there is no need to modify the color table to compensate for the lack of transparency support because either the source format does not use transparency or the target format supports transparency.

Subsequently, following block 108 or directly following decision blocks 104 or 106 in certain cases, the image is converted 110 from the source format to the target format. The conversion between image format is generally known in the art and such conversions will make use of the color table. In some cases the color table used has been modified by block 108, and in other cases, the color table has not been modified. Following block 110, the image format conversion processing 100 is complete and ends.

Figure 2A:
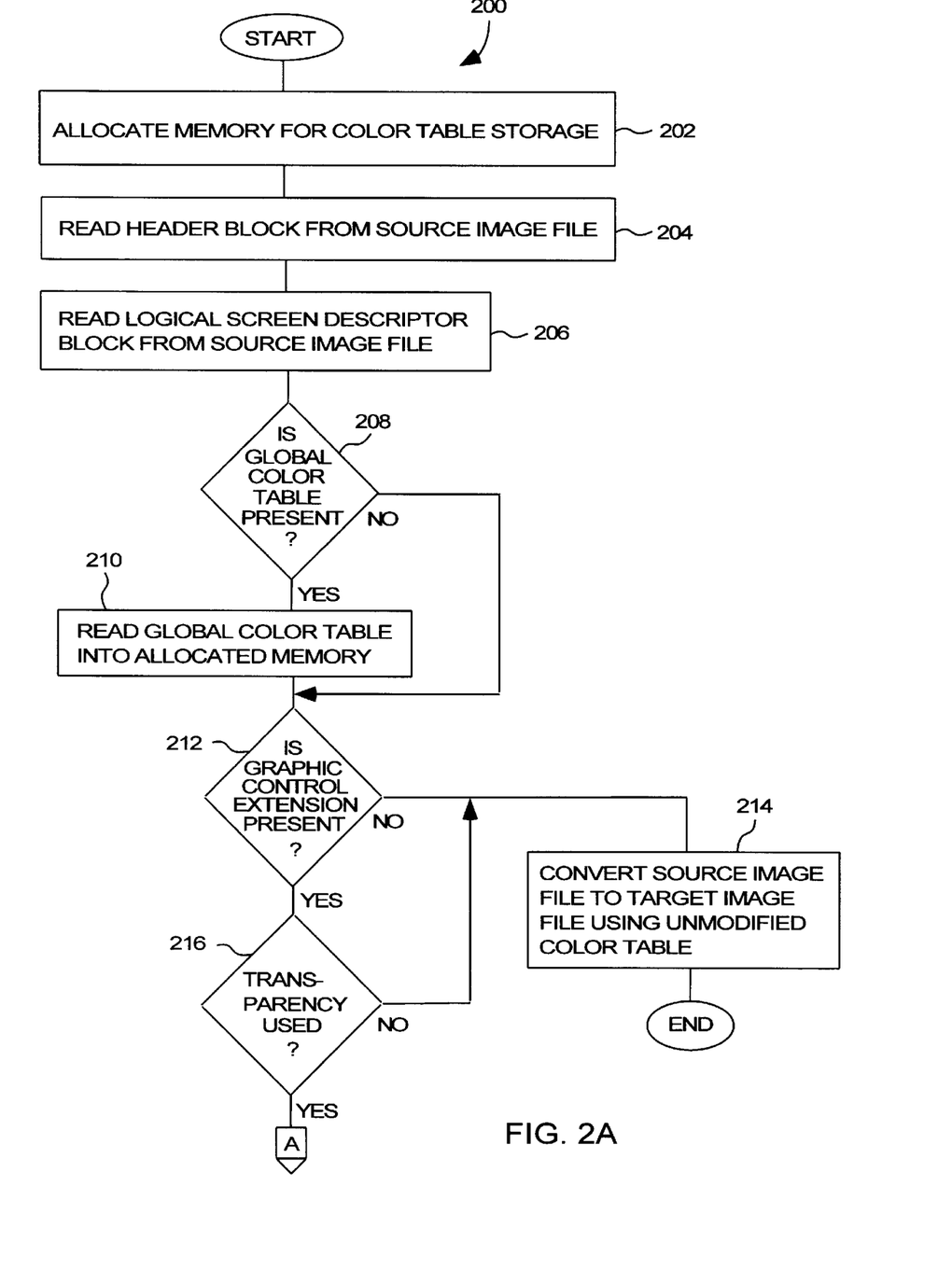
FIGS. 2A–2B are flow diagrams of image format conversion processing according to another embodiment of the invention.
Figure 2B:
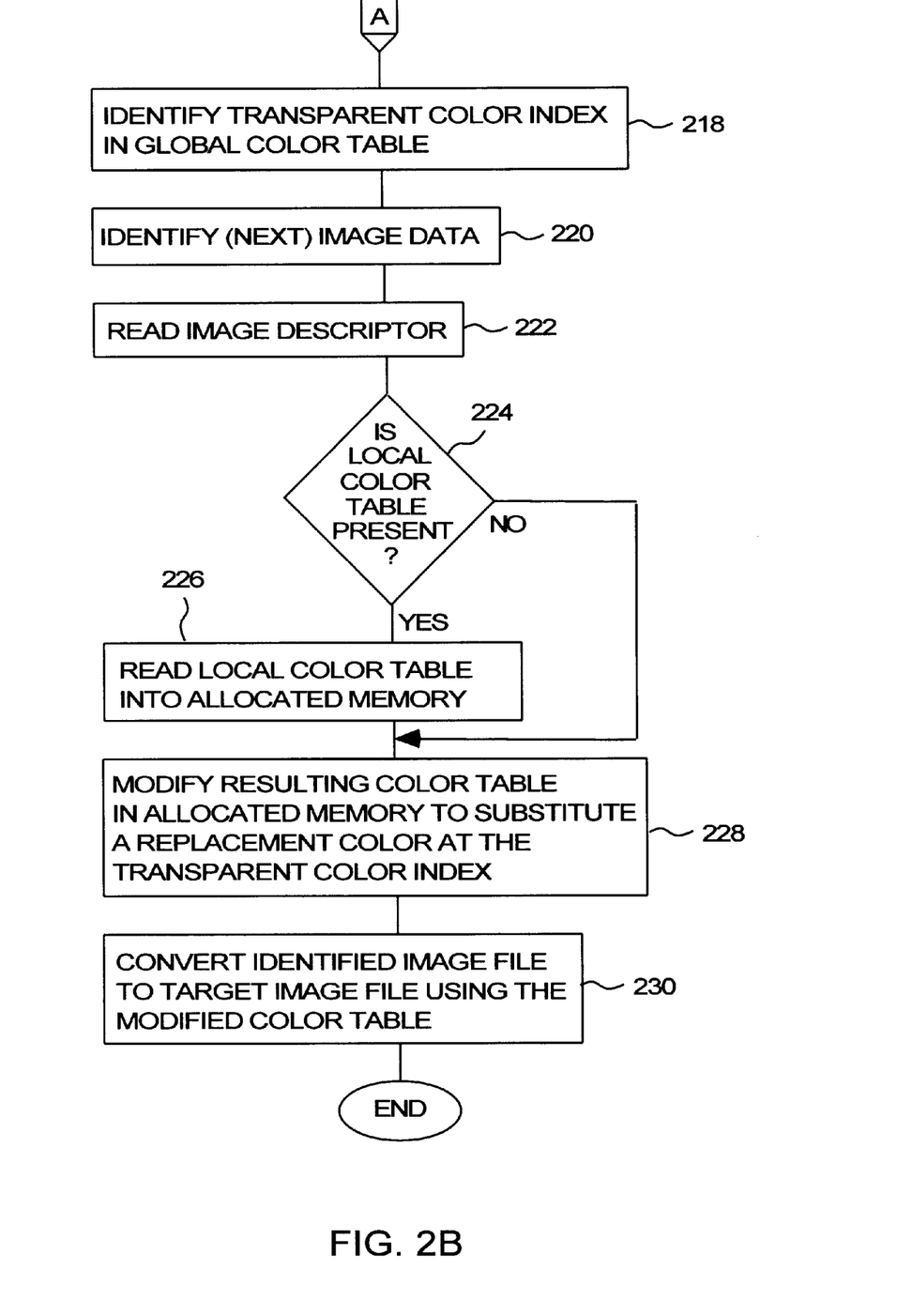

FIGS. 2A–2B are flow diagrams of image format conversion processing 200 according to another embodiment of the invention. The image format conversion 200 is performed by a computer system. As noted above, the image format conversion can be performed for any of a variety of reasons. The image format conversion 200 converts a source image file to a target image file. In this embodiment, it is assumed that the source image file has a GIF type format and that the target image file has a format that does not support transparency.

One example of one GIF type format that supports and often uses transparency is GIF89a, which pertains to Graphics Interchange Format (GIF), version 89a, by Compuserve Incorporated, Columbus, Ohio, and which is hereby incorporated by reference. GIF89a is used when the image file is to provide the appearance of animation on a display screen of a computer system by sequentially displaying a series of images. One example of a image format that does not support transparency is JPEG.

The image format conversion processing 200 initially allocates 202 memory for color table storage. Here, the memory is allocated from main memory of a computer system. The computer system operates to perform the image format conversion processing 200. Next, a header block is read 204 from the source image file. Then, a logical screen display descriptor block is read 206 from the source image file.

A decision block 208 then determines whether a global color table is present in the source image file. When the decision block 208 determines that a global color table is present, then the global color table is read 210 into the allocated memory. On the other hand, when the decision block 208 determines that the global color table is not present, then block 210 is bypassed.

Next, a decision block 212 determines whether a graphic control extension is present in the source image file. When the decision block 212 determines that a graphic control extension is not present, then the source image file is converted 214 to the target image file using an unmodified version of the color table. Here, the unmodified version of the color table is the color table that was read from the source image file. As will be noted below, the color table read from the source image file can be either a global color table or a local color table. in any case, the conversion between image formats is generally known in the art. For example, the conversion of GIF89a to JPEG is known in the art.

Alternatively, when the decision block 212 determines that a graphic control extension is present in the source image file, then a decision block 216 determines whether transparency is used within the source image file. When the decision block 216 determines that transparency is not being used, then the image format conversion processing 200 again operates to perform conventional image format conversion by performing block 214. Following block 214, the image format conversion processing 200 is complete and ends.

On the other hand, when the decision block 216 determines that transparency is being used, then the image format conversion processing 200 continues. Upon continuing, the image format conversion processing 200 identifies 218 a transparent color index in the global color table stored in the allocated memory. The transparent color index will identify a particular transparent color within the global color table that was utilized in the source image file to correspond to transparent pixels or other portions of the source image.

Next, an image block is identified 220. The image file includes one or more image blocks that contain an image descriptor and image data. The image blocks can also include a local color table. An image descriptor for the identified image data is then read 220. A decision block 224 then determines whether a local color table is present in the identified image block. Here, the decision block 224 evaluates the image descriptor read in block 222 to determine whether it mentions use of a local color table. When the decision block 224 determines that a local color table is present, then the local color table is read 226 into the allocated memory. Preferably, when the local color table read 226 into the allocated memory, it is superimposed over the global color table already stored in the allocated memory and thus supersedes its entries. On the hand, when the decision block 224 determines that a local color table is not present, then the block 226 is bypassed.

The resulting color table (global color table or local color table) in the allocated memory is then modified 228 to substitute a replacement color at the transparent color index. After modifying the resulting color table, the identified image file is converted 230 to a target image file using the modified color table. Again, the format conversion performed in block 230 is generally known in the art. Following block 230, the image format conversion processing 200 is complete and ends.

Although the image format conversion processing 200 is described as a single block conversion, the conversion performed in block 230 can operate on a block-by-block basis, in which case, blocks 220–230 would be repeated for each of the image blocks within the image source file. Similarly, the conversion performed in block 214 could also be performed on a block-by-block basis. With block-by-block processing some blocks could use the unmodified color table and others could use the modified color table. In any case, once the source image file has been completely converted to the target image file, the image format conversion processing 200 is completed.

Figure 3:
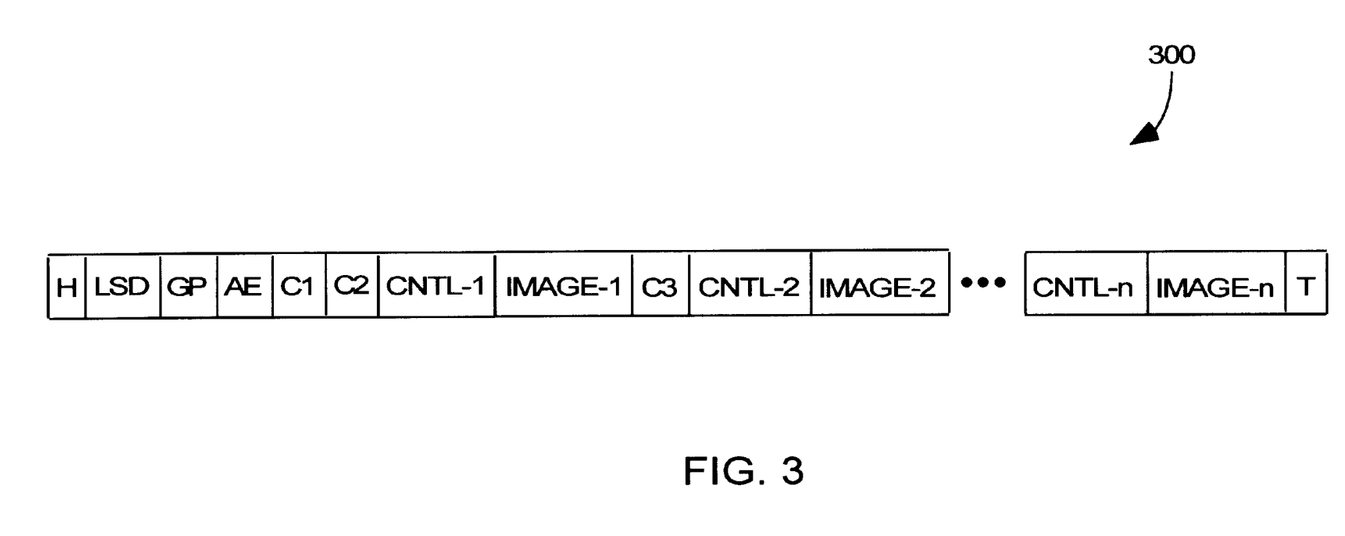
FIG. 3 is a diagram of an exemplary animated GIF data stream.

FIG. 3 is a diagram of an exemplary animated GIF data stream 300. The exemplary animated GIF data stream 300 includes a header (H), a logical screen descriptor (LSD), a global palette (GP), an application extension block (AE), a first comment (C1), a second comment (C2), a first control block (CNTL-1), a first image block (IMAGE-1), a third comment (C3), and subsequent sequential pairs of control blocks and image blocks (CNTL-2, IMAGE-2, ...CNTL-n, IMAGE-n), and finally a trailer (T). The image format conversion processing 200, 300 operates to read the global palette (GP) (global color table) and modify it to provide an appropriate transparent color in cases where the GIF data stream 300 is to be converted into a image format that does not support transparency. Additional details on animated GIF images can be found in GIF89a which is a GIF image format for animated images and GIF 87a which is an earlier GIF specification, both of which are hereby incorporated by reference.

Figure 4:
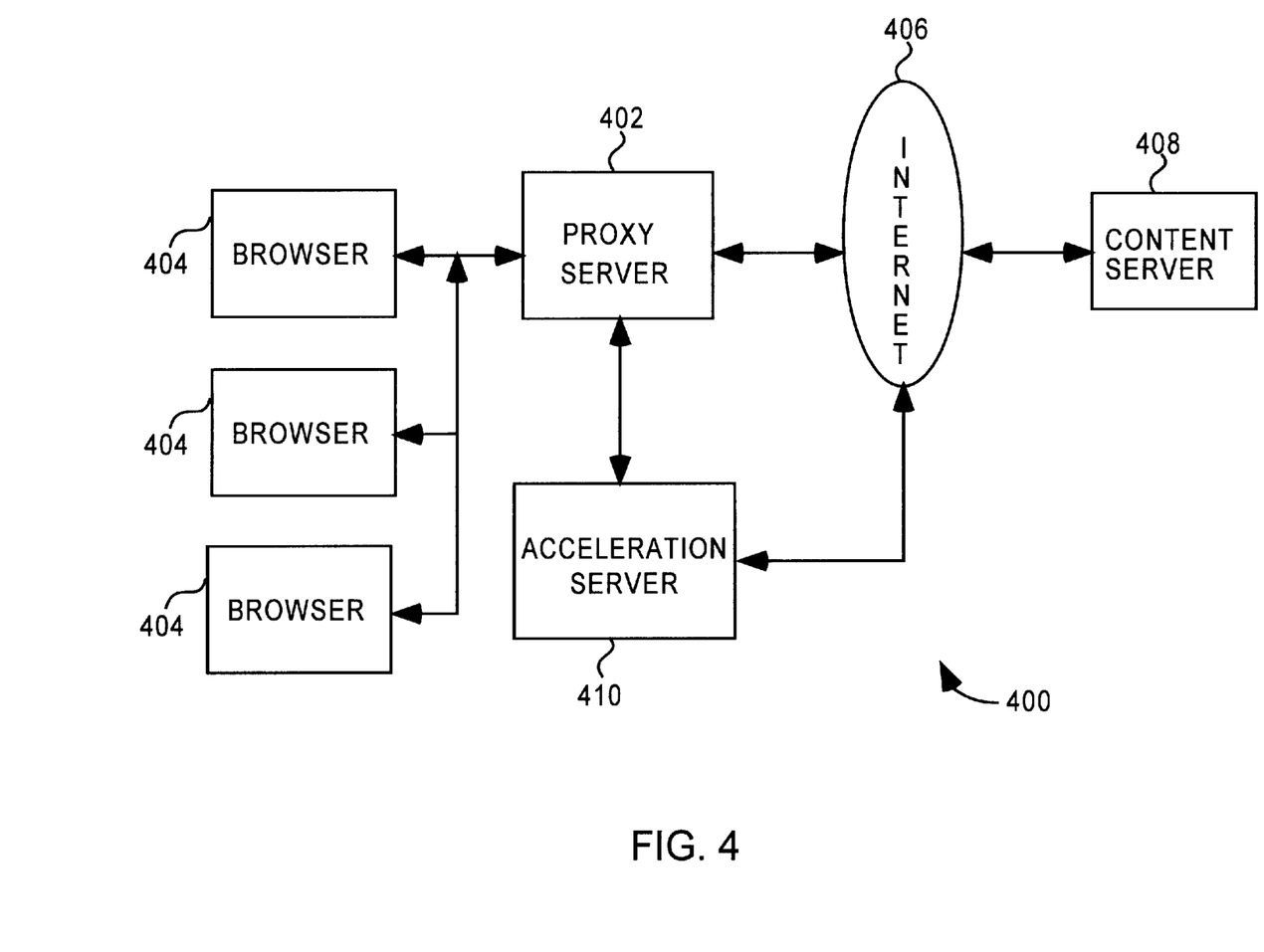
FIG. 4 is a proxy system that provides improved data delivery over a network.

The image format conversion processing 200, 300 is performed by a computer system. In one embodiment, the computer system is a proxy server that stores images and other objects for delivery to requesting users over a network (e.g., the Internet). FIG. 4 illustrates a representative proxy system that can operate to perform the image format conversion processing 200, 300.

FIG. 4 is a proxy system 400 that provides improved data delivery over a network. The proxy system 400 includes the proxy server 402 that couples to network browsers 404. The proxy server 402 is also coupled to the Internet 406. The Internet 406 is a collection of interconnected computer systems, some of which act as content servers. Accordingly, FIG. 4 illustrates the Internet 406 coupled to a content server 408 as a representative one of the content servers associated with the Internet 406. Additionally, the proxy system 400 includes an acceleration server 410. The acceleration server 410 couples to the proxy server 402 as well as the Internet 406.

The proxy system 400 is able to provide improved content (data) delivery over the Internet 406. Namely, the proxy system 400 operates to speed up the response time that a user of one of the browsers 404 undergoes after requesting some content from the content server 408 until the requested content is supplied to the user at one of the browsers 404. The requested content includes images and other objects. Given the large file sizes often associated with images, the proxy system 400 will often perform image format conversion so that the images are converted into an image format that provides more compression. For example, conversion of images from a GIF format to a JPEG format usually decreases the file sizes of the images. A reduction in file size means that the image can be stored by the proxy system 400 using less disk storage space and can be transmitted to a requestor in less time.

The general operation of the proxy system 400 is as follows. Normally, as a user of one of the browsers 404 makes a request for data from a content server on the Internet 406. The proxy server 402 initially intercepts the request for data from the browser 404 and determines whether the request for data can be satisfied locally by the proxy server 402 or the acceleration server 410. When the proxy server 402 determines that the request for data cannot be satisfied locally, the proxy server 402 forwards the request for data to the content server 408 through the Internet 406. In this case, the previously intercepted request for data is passed through the proxy server 402 to the content server 408 via the Internet 406 so that the request for data can be satisfied in a conventional, unaccelerated manner.

On the other hand, when the proxy server 402 determines that the request for data can be satisfied locally with an improved response time (i.e., accelerated delivery) to the user, then the proxy server 402 and the acceleration server 410 operate to satisfy the request for data using information locally stored, thereby avoiding the need to traverse the sluggish Internet 406 and retrieve the requested data from the content server 408. Also, if the acceleration server 410 believes it can satisfy the request for data locally but the necessary information is not yet locally available, then the acceleration server 410 operates to retrieve the requested data from the content server 408 with a pre-fetch operation and then locally store the necessary information. Thereafter, the acceleration server 410 can satisfy the request for data from local storage. In either of these cases, the data returned to the browser 404 in response to the request for data will not only be locally available but also be reduced in size (e.g. reduced file size). Both of these features contribute to the ability of the proxy system 400 to significantly improve the response time in which the requested data can be delivered to the browser 404. Accordingly, the proxy server 402 acting together with the acceleration server 410 is able to accelerate the delivery of the requested data to the user of the browser 404 that has made the request.

During normal operation of the proxy system 400, the addition of the acceleration server 410 to the proxy system 400 causes the delivery of requested data to be delivered to a user in an accelerated manner. However, if the number of users (i.e., clients) being serviced by the proxy system 400 becomes significant and the number of accelerated versions needed at any point in time becomes too large for the acceleration server 410 to handle, this concentrated processing burden can cause the performance of the acceleration server 410, and thus the proxy system, to degrade. The invention resolves this potential problem by managing the load on the acceleration server 410 such that even in the worst case condition the performance of the proxy server 400 is, for example, no worse than it would be had the proxy system been a conventional proxy server (i.e., without acceleration capabilities).

Figure 5:
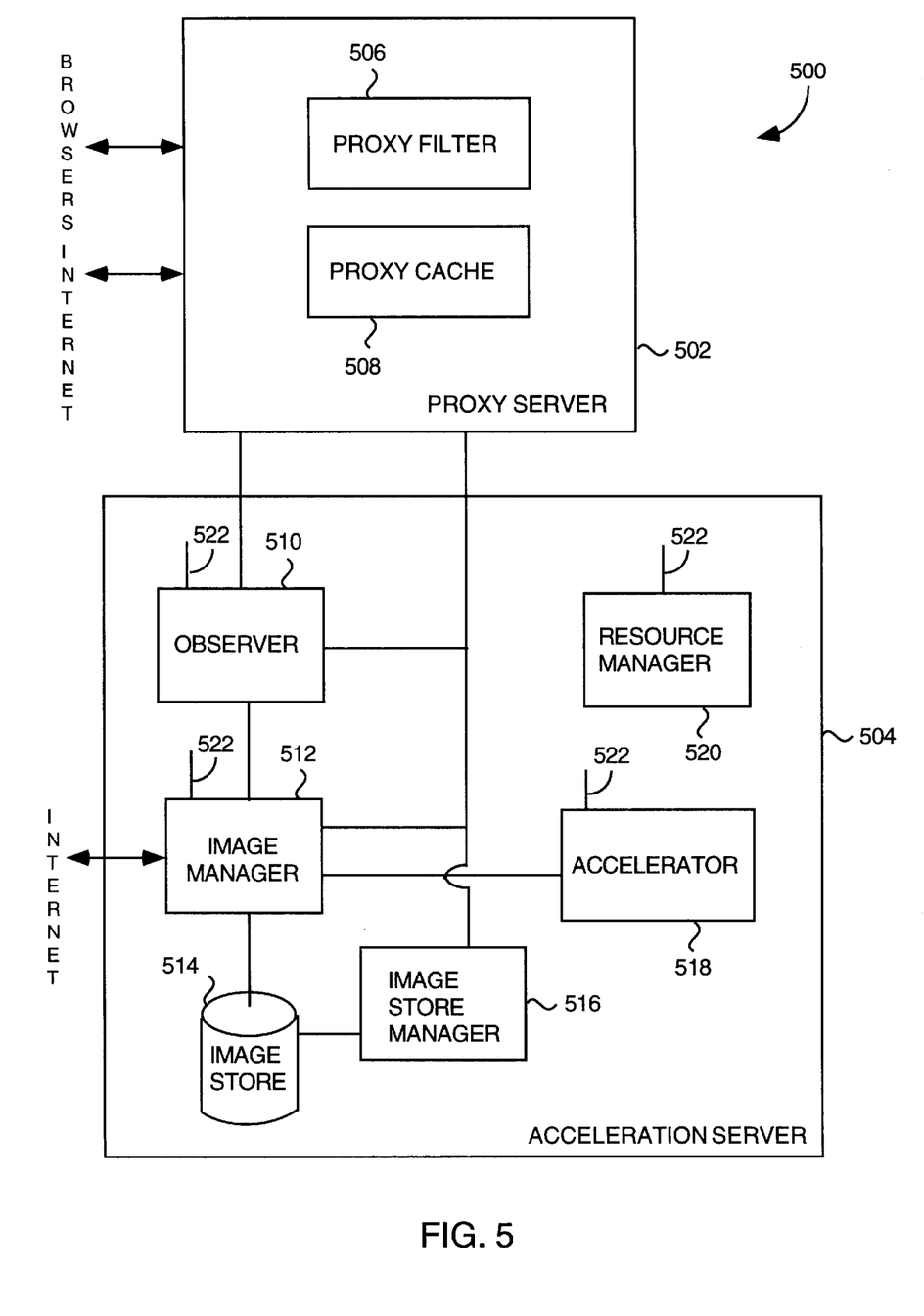
FIG. 5 is a block diagram of a proxy system according to an embodiment of the invention.

FIG. 5 is a block diagram of a proxy system 500 according to an embodiment of the invention. The proxy system 500 includes a proxy server 502 and an acceleration server 504. As an example, the proxy server 502 can correspond to the proxy server 402 illustrated in FIG. 4, and the acceleration server 504 can correspond to the acceleration server 410 in FIG. 4.

The proxy server 502 includes a proxy filter 506 and a proxy cache 508. The proxy filter 506 monitors requests for data received from the browsers 404. The proxy filter 506 then filters out those requests that it believes it can accelerate the delivery of the requested data to the user of the browsers 404. The proxy filter 506 then forwards these requests that it believes it can accelerate to the acceleration server 504. The proxy cache 508 operates as a cache storage area in which responses to earlier requests from the Internet 406 made by the browsers 404 can be temporarily saved and satisfied thereafter from the proxy cache 508 if any of the browsers 404 make the same request for data while the data remains stored in the proxy cache 508. Hence, the proxy cache 508 provides local storage for content data that was previously requested by one of the browsers 404, and thus provides rapid access to the same content data as long as the content data remains stored in the proxy cache 508. However, the content stored in the proxy cache 508 is not accelerated, but merely non-accelerated content obtained by the proxy server 502 from a content server through the Internet 406.

It should be noted that conventional proxy servers include a cache to temporarily store content obtained from a content server via the Internet. An example of such a conventional proxy server is Microsoft Proxy Server, produced by Microsoft Corporation. Hence, the proxy server 502 includes the proxy cache 508 because the proxy system 500 according to the invention can be built using a conventional proxy server suitably modified to include primarily the proxy filter 506. In other words, the proxy cache 508 need not be included in the proxy server 502 of the proxy system 500 or if provided can be disabled or used in conjunction with the acceleration server 504.

The proxy filter 506 supplies those of the data requests it believes it can accelerate to the acceleration server 504. For example, a data request (e.g., World Wide Web page request) can be evaluated to determine if it includes images. Given that images are separate files that tend to have relatively large file sizes, images are good candidates for acceleration. Hence, a data request associated with one or more images files (such as many World Wide Web pages) is an example of a data request that the proxy filter 506 would believe it could accelerate. Also, another common data request would be an image request (e.g., GET image request in HTTP) for a particular image file from a content server via the Internet. The proxy filter 506 would also believe it could accelerate the delivery of such image files.

The acceleration server 504 includes various components to perform processing operations used in producing and/or supplying an accelerated response to a data request back to the proxy server 502. The major components of the acceleration server 504 are illustrated in FIG. 5 and discussed below.

An observer 510 receives a data request via the proxy filter 506. The observer 510 examines the data request to identify images associated therewith. In this embodiment, the acceleration server 504 is operating to accelerate the delivery of images to the browser 404 that made the request for data that is or includes the images. The identified images are then forwarded to an image manager 512. The image manager 512 determines whether the desired images are already stored in an image store 514. The image manager 512 can determine those images already stored in the image store 514 using an image store manager 516. If the desired images are already stored in the image store 514 when requested by the requesting browser 404, copies of the desired images are supplied from the image store 514 to the proxy server 502 and then forwarded from the proxy server 502 to the requesting browser 404. On the other hand, if the image manager 512 determines that the requested images are not yet stored in the image store 514, then the images can be obtained directly from the Internet by the image manager 512 using a high speed connection. Once retrieved, the images are evaluated to determine whether they can be accelerated by an accelerator 518. If the images can be accelerated, then the accelerator 518 produces an accelerated version of the image and stores the accelerated version in the image store 514. Additionally, the image manager 512 can also store an original version of the image in the image store 514. Thereafter, the proxy server 502 can return the requested image to the requesting browser 404 in a rapid manner when requested by the requesting browser 404. When the proxy server 502 has an accelerated version of the image to return to the browser 404, the response time to the browser 404 is even further improved by the proxy system 500. Namely, the time to transmit a file (e.g., image file) from the proxy system 500 to one of the browsers 404 is proportional to file size. Therefore, given that the accelerated versions have a smaller size, the accelerated versions can be transmitted to the browsers 404 in a reduced amount of time (i.e., improved response time). Also, in cases of excessive processing load, the acceleration server 504 can take appropriate action to reduce the processing load due to production of accelerated versions so that the overall responsiveness of the proxy system 500 is not hindered even in worst case conditions.

The image store 514 provides storage for images and provides image data to requesting other components of the proxy system 500. Additionally, as noted above, the image store 514 is also associated with an image store manager 516 that manages the allocation of slots, the removing of old slots, and provides state management of slots and objects.

The images stored in the image store 514 include original versions of images that have been retrieved from a content server (e.g., original versions) and accelerated versions of these images. More particularly, within each slot provided in the image store 514, a collection of information is provided, including HTTP request and response entities, validity information (used to implement HTTP cache coherency algorithms), statistics information, and a collection of related objects (e.g., images). Typically, the collection of related objects includes an original object and one or more accelerated objects. Associated with each object is not only the object data itself but also object state information (e.g., loading, done, etc.).

Generally, the image store 514 can operate to provide the following functions: creation of the slot, adding an object to the slot, streaming data to fill an object within a slot, retrieval of an object from a slot, and checking if a slot is within the image store 514. Additionally, in the background mode, the image store 514 in conjunction with the image store manager 516 can also function to perform validity checking, storage management, and slot and object state management. Normally, to prevent the image store 514 from filling up and remaining full, the slots within the image store 514 should be recycled periodically to manage the space for storage provided by the image store 514. The image store 514 can also maintain and implement a HTTP proxy cache coherency protocol for all images stored in the image store 514.

The image store 514 can be created in a number of different ways. For example, the image store can be implemented as a proxy cache, a database or a HTTP server with extensions, or some combination of the foregoing. Further, the image store 514 can also be accessed by a common standard interface that is usable by the other components of the proxy system 500. In one embodiment, the interface is achieved by an image store plug-in (e.g., a DLL or a shared library), and the image store 514 uses a database and a MS PROXY 2.0 to implement the image store 514.

The advantages of the invention are numerous. One advantage of the invention is that display of the image resulting from the image format conversion appears more like the original image. Another advantage of the invention is that the transparency color for those portions of an image intended to be transparent is controllable.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for converting a source image file having a first image format to a target image having a second image format, the method comprising the acts of:

(a) determining whether the source image file having the first image format uses at least one transparent portion;

(b) receiving a color table from the source image file;

(c) identifying a transparent color for the at least one transparent portion from the color table;

(d) determining a replacement transparent color for use with the target image having the second image format;

(e) modifying the color table by substituting the replacement transparent color for the transparent color; and (f) thereafter converting the source image file having the first image format to the target image file having the second image format in accordance with the modified color table.

2. A method as recited in claim 1, wherein the first image format is a GIF format and the second image format is a JPEG format.

3. A method as recited in claim 1, wherein the determining (d) of the replacement transparent color comprises identifying a predetermined color.

4. A method as recited in claim 1, wherein the determining (d) of the replacement transparent color comprises:

determining a background color to be displayed behind the target image on a display screen; and setting the replacement transparent color to the background color.

5. A method as recited in claim 1, wherein the method further comprises:

(g) bypassing acts (c)–(f) when the determining (a) determines that the source image lacks at least one transparent portion, and converting the source image file having the first image format to the target image file having the second image format in accordance with the color table.

6. A method for converting a source image file having a first image format to a target image having a second image format, the method being performed by a computer system including a memory, the method comprising the acts of:

(a) allocating a memory block in the memory of the computer system;

(b) reading a header block from the source image file;

(c) reading a logical screen descriptor block from the source image file;

(d) determining whether a color table is present in the source image file;

(e) reading the color table into the memory block when the determining (d) determines that the color table is present in the source image file;

(f) reading a graphic control block for an image block in the source image file;

(g) determining whether transparency is used in the image block by an examination of the graphic control block;

(h) identifying a transparent color index for the color table;

(i) determining a replacement transparent color for use with the target image having the second image format, where the second image format does not support transparency;

(j) modifying the color table by substituting the replacement transparent color for the transparent color; and (k) thereafter converting the source image file having the first image format to the target image file having the second image format in accordance with the modified color table.

7. A method as recited in claim 6, wherein the first image format is a GIF format and the second image format is a JPEG format.

8. A method as recited in claim 6, wherein the determining (i) of the replacement transparent color comprises identifying a predetermined color.

9. A method as recited in claim 6, wherein the determining (i) of the replacement transparent color comprises:

determining a background color to be displayed behind the target image on a display screen; and setting the replacement transparent color to the background color.

10. A computer readable medium containing computer program code for converting a source image file having a first image format to a target image having a second image format, said computer readable medium comprising:

computer program code for receiving the source image file having with the first image format that uses at least one transparent portion;

computer program code for receiving a color table from the source image file;

computer program code for identifying a transparent color for the at least one transparent portion from the color table;

computer program code for determining a replacement transparent color for use with the target image having the second image format;

computer program code for modifying the color table by substituting the replacement transparent color for the transparent color; and computer program code for converting the source image file having the first image format to the target image file having the second image format in accordance with the modified color table.

11. A computer readable medium method as recited in claim 10, wherein the first image format is a GIF format and the second image format is a JPEG format.

12. A computer readable medium as recited in claim 10, wherein said computer program code for determining the replacement transparent color comprises computer program code for identifying a predetermined color.

13. A computer readable medium as recited in claim 12, wherein said computer program code for determining the replacement transparent color comprises:

computer program code for determining a background color to be displayed behind the target image on a display screen; and computer program code for setting the replacement transparent color to the background color.

14. A computer readable medium as recited in claim 10, wherein said computer program code for determining the replacement transparent color comprises:

computer program code for determining a background color to be displayed behind the target image on a display screen; and computer program code for setting the replacement transparent color to the background color.

15. A computer readable medium as recited in claim 14, wherein said computer readable medium further comprises:

computer program code for bypassing said computer program code for identifying, said computer program code for determining, said computer program code for modifying and said computer program code for converting acts when the source image lacks at least one transparent portion, and converting the source image file having the first image format to the target image file having the second image format in accordance with the color table.

16. A computer readable medium as recited in claim 10, wherein said computer readable medium further comprises:

computer program code for bypassing said computer program code for identifying, said computer program code for determining, said computer program code for modifying and said computer program code for converting acts when the source image lacks at least one transparent portion, and converting the source image file having the first image format to the target image file having the second image format in accordance with the color table.

17. A computer readable medium as recited in claim 16, wherein said computer readable medium is one of a data storage disk, a carrier wave, and an integrated circuit.

18. A computer readable medium method as recited in claim 17, wherein the first image format is a GIF format and the second image format is a JPEG format.

19. A computer readable medium as recited in claim 10, wherein said computer readable medium is one of a data storage disk, a carrier wave, and an integrated circuit.

* * * * *